United States Patent [19]
Tangonan et al.
[11] Patent Number: 4,953,155
[45] Date of Patent: Aug. 28, 1990

[54] CURRENT SUMMED OPTOELECTRONIC CROSSBAR SWITCH

[75] Inventors: Gregory L. Tangonan, Oxnard; Vincent L. Jones, Simi Valley; Stephen R. Forrest, Torrance, all of Calif.

[73] Assignee: Hughes Aircraft Company, Los Angeles, Calif.

[21] Appl. No.: 146,062

[22] Filed: Jan. 20, 1988

[51] Int. Cl.[5] .................... H04J 14/00; H04B 10/00

[52] U.S. Cl. .................................... 370/1; 250/553; 340/825.81; 350/96.14; 455/600

[58] Field of Search ........................ 350/96.13, 96.14; 250/551, 553; 455/600, 612, 617; 370/1; 340/825.81, 825.82

[56] References Cited

U.S. PATENT DOCUMENTS

| | | | |
|---|---|---|---|
| 4,074,142 | 2/1978 | Jackson | 455/600 |
| 4,221,932 | 9/1980 | Anglikowski | 455/615 |
| 4,696,059 | 9/1987 | MacDonald | 455/600 |

FOREIGN PATENT DOCUMENTS

| | | | |
|---|---|---|---|
| 0053028 | 6/1982 | European Pat. Off. | 455/617 |

OTHER PUBLICATIONS

"Monolithically Intregrable High Speed Photodetectors", D. J. Jackson et al, Proc. SPIE 716 (1987) 104.

"Symmetric MOTT Barrier As a Fast Photodetector", Wei et al., Electron Lett 17, 688 (1981).

"Optoelectronic Broadband Switch Array", MacDonald et al., Electron Lett 14 (1978) page 502.

R. A. Peters, "Optical Switch Matrices for SS-TDMA Applications", Proc. of 7th International Conf. on Digital Satellite Communications, May 12-16, 1986, pp. 579-585.

L. D. Hutcheson, "Optical Interconnect Technology Developments", 1986, Proc. Fall Joint Computer Conf., Nov. 2-6, 1986, pp. 448-456.

S. F. Sun et al., "A Review on Classification of Optical Switching Systems", IEEE Communications Magazine, vol. 24, No. 3, May 3, 1986, pp. 50-55.

*Primary Examiner*—Joseph A. Orsino
*Assistant Examiner*—L. Van Beek
*Attorney, Agent, or Firm*—V. D. Duraiswamy; W. K. Denson-Low

[57] ABSTRACT

An optoelectronic crossbar switch 50 for selectively connecting signals on a plurality of optical fiber channels 52 to a given number of output receivers 30-36. Each optical fiber channel is split into a different number of optical fibers 56(*a-h*) which are arranged into an array having a plurality of rows and columns. Each row contains a fiber from each channel. A current summation network 58 is provided for each row and advantageously employs a plurality of selectively activatable detectors 60-74. The detectors are held in their open circuit state via a CMOS multiplexer 80 so as to minimize crosstalk between addressed and nonaddressed detectors. The switch 50 construction also minimizes the number of required components.

9 Claims, 2 Drawing Sheets

50
106
78a
78b
58b
78c
78d
78e
78f
78g
78h
58a
104
108
96
76
80
94
74
92
72
90
70
88
68
86
66
84
64
82
62
60
98
100
102
56a
56b
56c
56d
52
54
56e
56f
56g
56h
58h

CURRENT SUMMED OPTOELECTRONIC CROSSBAR SWITCH

The U.S. Government has rights in this application pursuant to Contract No. N 6601-86-C-0110 with the Department of the Navy.

CROSS REFERENCE TO RELATED APPLICATIONS

The subject matter of this application is related to U.S. patent application Ser. No. 07/138,619, filed Dec. 28, 1987, entitled "Distributed Crossbar Switch" by Tangonan which is assigned to the same assignee as the present invention, which is incorporated herein by reference.

BACKGROUND OF THE INVENTION

1. Technical Field

This invention relates to switching devices and, more particularly, to techniques for switching a multiplicity of data signals in communication networks.

2. Discussion

Computer architectures now commonly include a large number of processors that execute programs concurrently. These so called parallel computing architectures typically require a communication network that allows efficient data transfer between processors, and between an individual processor and its associated memories. In many parallel processing systems it is desirable to permit many processors to transfer information simultaneously. The use of optics to accomplish this task is particularly effective since optical systems can provide appropriate inherent parallelism, suitable band widths and low interaction between the separate beams in a linear medium. One of the most important optical systems is known as a crossbar network. A crossbar network permits a plurality of processors or memories to be dynamically interconnected in any selected configuration without moving any existing interconnections.

FIG. 1 illustrates a known "star" crossbar network 10 that is disclosed in more detail in the paper authored by MacDonald et al., in Electron Lett. 14 (1978) page 502, entitled "Optoelectronic Broadband Switch Array" which is hereby incorporated by reference. Briefly, network 10 includes four transmitters 12, 14, 16 and 18 which may be connected to one or more processors. The transmitters provide input signals which are coupled to optical fibers 20, 22, 24 and 26. The fibers are, in turn, fanned out and made incident on a plurality of detectors 28. Each of the detectors includes a photodetector 29 connected in series with a preamplifier 31. Each of the detectors operates to selectively convert light incident on its associated photodetector to an appropriate electrical signal. The detectors are arranged in an array of rows and columns. Each of the detectors in a row are connected to a common output line 33. The outputs of the lines 33 are coupled for rebroadcast to suitable output receivers labeled 30–36 in FIG. 1. Typically, optical fibers are used to transmit the signals from the crossbar network 10 to these receivers. Accordingly, an additional reconversion of the electrical signals on lines 33 to optical signals are performed by optical repeaters 38–44.

Typically, the selection of which detector to supply its output signal onto line 33 is made by bias control circuitry (not shown). In many of the known crossbar networks it is necessary to provide a deactivating bias to all of the detectors which are not selected. As a result, the switching control is somewhat complicated and unwanted noise crosstalk between detectors has been experienced. In addition, each detector requires its own preamplifier circuitry. Thus, the necessity for these additional components limits the ability to fabricate large, compact crossbar networks.

SUMMARY OF THE INVENTION

In accordance with the present invention, a crossbar switch is provided for selectively connecting signals from M optical fiber channels to N optical receivers. The switch includes a splitter for splitting each optical channel into N optical fibers. The fibers are arranged in an array having a plurality of rows and columns, each row containing fibers from each channel. A summation network is provided for each row of fibers. The network includes M selectively activatable detectors each receiving optical signals for a given fiber. Each detector provides an electrical output signal at its output if activated by a given bias signal illuminated by an incident optical signal from its associated fiber. Addressing means coupled between a source of the bias voltage and the detectors are utilized to selectively activate a given detector by applying the bias voltage source thereto. All of the detector outputs are coupled to a common node which, in turn, requires only one amplifier means for amplifying the current delivered to the node from the selected detector. Accordingly, only one amplifier is required for each row of fibers thereby minimizing the number of components required for the crossbar switch.

BRIEF DESCRIPTION OF THE DRAWINGS

The various advantages of the present invention will become apparent to those skilled in the art after reading the following specification and by reference to the drawings in which.

DESCRIPTION OF THE PREFERRED EMBODIMENT

Figure 2:
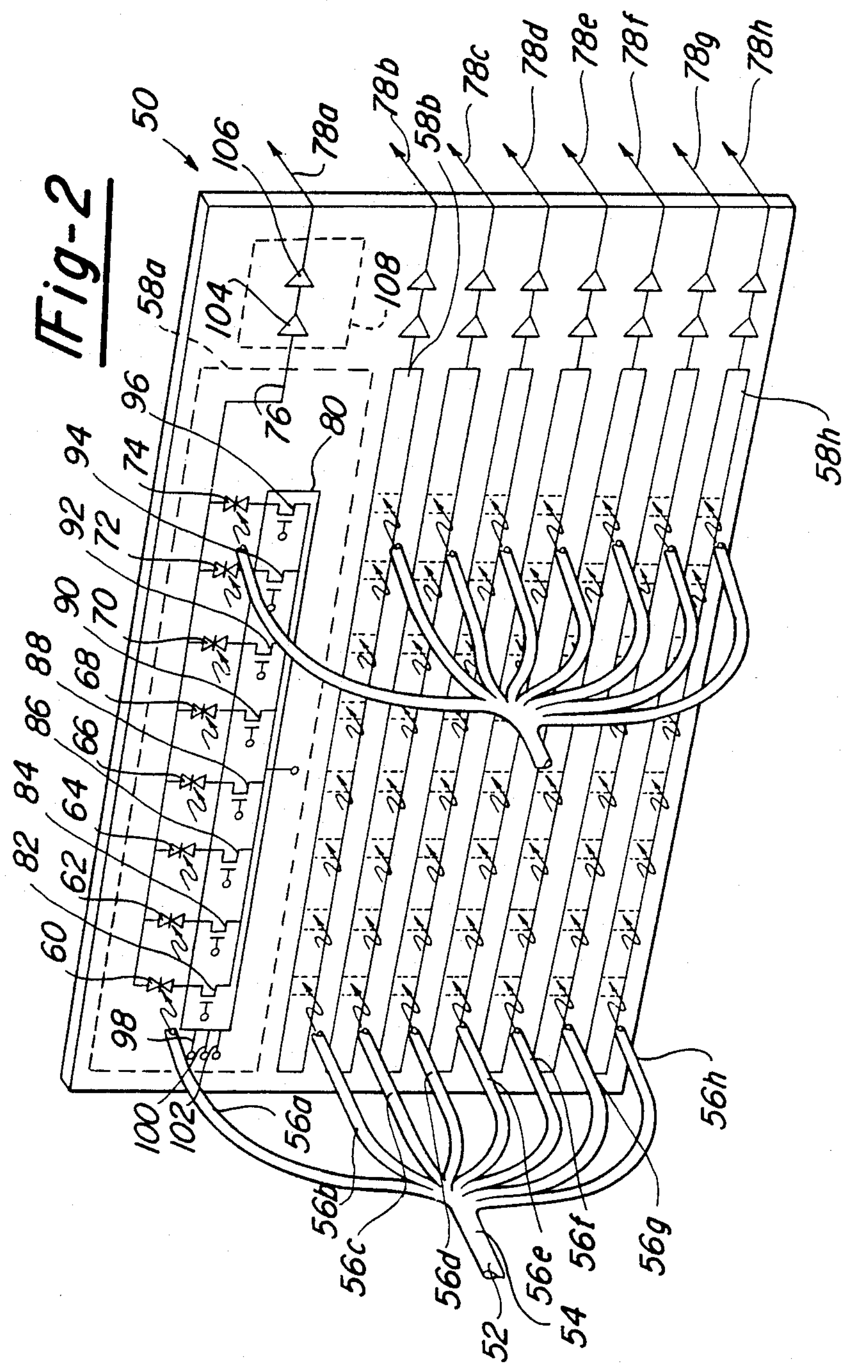
FIG. 2 is a schematic diagram of a crossbar switch made in accordance with the teachings of the present invention.

Turning now to FIG. 2, a crossbar switch 50 of the preferred embodiment of this invention is illustrated. It includes an 8×8 array of detectors for receiving outputs from a like number of optical fibers split from eight optical channels. In FIG. 2, for sake of simplifying the drawing, one optical channel 52 is illustrated which is split by suitable splitter means 54 into eight separate optical fibers *56a–56h*. The other seven optical channels are similarly split and the outputs of the individual fibers are arranged in an array having a plurality of rows and columns. In this embodiment, there are eight rows and eight columns. Each row includes a substantially identical summation network *58a–58h*. Since each of the summation networks is substantially identical in construction, a detailed description of only one of them will suffice. Network *58a* includes eight different photodetectors 60–74. Each of the photodetectors receives light from a fiber associated with a different optical channel. In the preferred embodiment, each photodetector 60–74 is a metal-semiconductor-metal (MSM) device fabricated from gallium arsenide (GaAs). MSM devices are preferred because they are efficient detectors with excellent on/off switching capabilities. The excellent on/-off ratio results from the absence of any photovoltaic effect at zero current or zero voltage. Preferably, the MSM devices are constructed of two integral, back-to-back Schottky barrier diodes formed by the deposition of an interdigitated tungsten cathode and anode deposited onto the surface of a <100> semi-insulating gallium arsenide substrate. Further characteristics of suitable MSM detectors are described in D. J. Jackson et al, "Monolithically Intregrable High Speed Photodetectors", Proc. SPIE 716 (1987) 104; and Wei et al, "Symmetric MOTT Barrier As A Fast Photodetector", Electron Lett 17, 688 (1981), both of which are hereby incorporated by reference.

All of the outputs of the detectors 60–74 are coupled to a common line or node 76. Provision is made for addressing selected detectors so that they may operate to switch a signal from one or more of the eight optical input channels to the output receiver connected to the crossbar row outputs 78(*a–h*). It has been found that advantageous results can be obtained if the nonaddressed detectors 60–74 are placed into a substantially open circuit condition while applying a bias voltage only to those detectors desired to respond to the light incident upon them. Normally, only one detector is addressed or activated at one time. This so called "zero-current" operation substantially simplifies the addressing scheme required while also minimizing crssstalk between detectors. To this end, a complimentary metal oxide semiconductor (CMOS) multiplexer 80 is employed to selectively couple a suitable bias source $V_B$ to one or more of the detectors 60–74. CMOS devices for the multiplexer 80 are preferred because of their extremely large input impedance when in the nonconducting state. When each detector is in the "off" state or nonaddressed state, the gate-to-source potential of its associated CMOS device 89–96 is much greater than the pinch off voltage for the FET. Thus, the potential across the MSM detector 60–74 will be zero. Thus, due to the lack of photovoltaic effect characteristic of the MSM detector its photocurrent is also zero. Hence, when the CMOS device 82–96 is in the "off" state, the detector 60–74 response is zero independent of whether or not there is an optical signal incident thereon. This provides for a high degree of isolation between detectors which are in the "off" state and the "on" states. A photodetector can be switched to the "on" state by appropriately applying control signals to the control input lines 98–102 to the multiplexer 80. The combination of signals on these lines is decoded and used by the multiplexer 80 to provide the appropriate gate voltage on one of the CMOS devices 82–96 so that it will conduct and thereby connect the bias voltage $V_B$ to the selected detector. In this embodiment, the desired photodetector is addressed (or switched "on") by setting the gate voltage to zero.

Note that this circuit provides for superior low noise performance than earlier known architectures where the detection element is switched to ground potential when in the "off" state. In this latter situation, a small photocurrent can be generated by the photodetector since such a current will generate a small voltage. Accordingly, a small signal can appear at the output of the receiver which can interfere with the photocurrent generated by the photodetectors in the "on" state. Other noise sources are minimized in this configuration. The effects of thermal resistance noise are minimized by the high resistances in each of the "off" state detectors. The total capacitance of the detector array is lessened by the series combination of the detector and CMOS switch capacitances. Lastly, the effect of light modulated conductances on the diodes has a minimal effect on input noise because of the series conductance of the CMOS switch.

Figure 1:
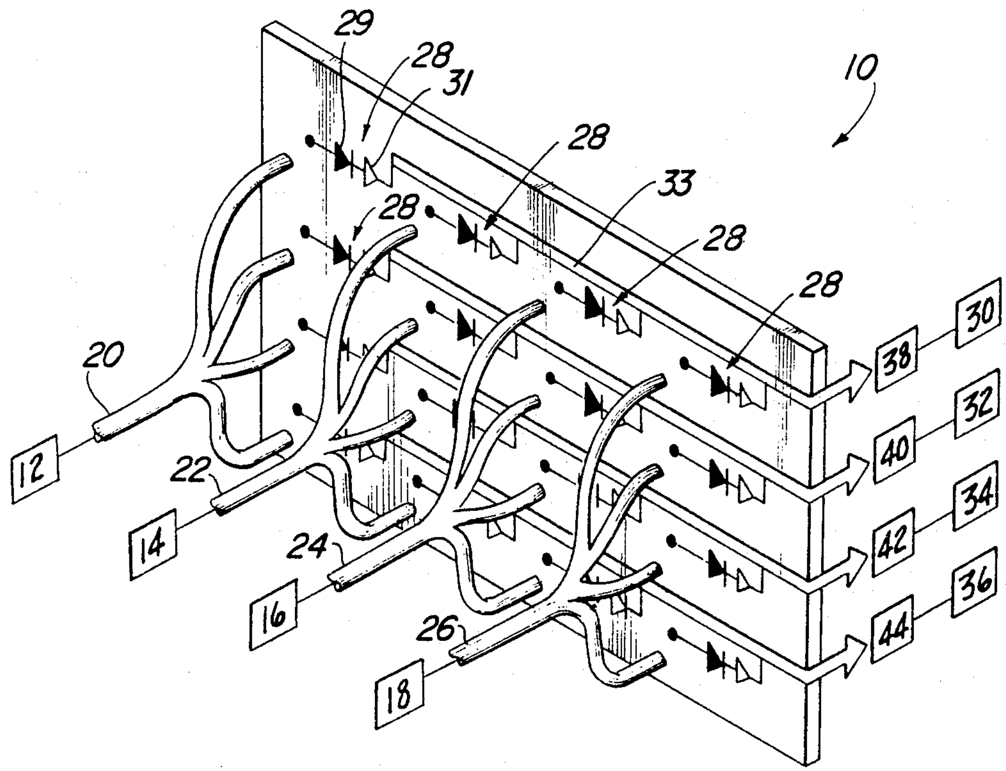
FIG. 1 is a perspective view of a crossbar switch of the prior art.

The developed photocurrent from the addressed detector is coupled to node 76 and fed to the input of a preamplifier 104 which serves as a current to voltage converter for generating a voltage output signal as a function of the electrical current from one of the photodetectors. Its output is coupled to an amplifier circuit 106 which serves to boost the preamplified voltage to a level suitable for use by the optical repeaters which are coupled to the output lines 78(*a–h*) in a conventional manner. It is important to note that only one amplification network 108 is required for each row in the crossbar network 50. Accordingly, the number of components has been kept to a minimum, especially as compared to the prior art device shown in FIG. 1 which requires a preamplifier for every detector.

The various advantages of the present invention will become apparent to those skilled in the art after having the benefit of reading the specification, studying the drawings and by reference to the following claims.

What is claimed is:

1. An optoelectric crossbar switch for selectively connecting signals from M optical fiber channels to N output receivers, said switch comprising:

splitter means for splitting each optical channel into N optical fibers;

said fibers being arranged in an array having a plurality of rows and columns, each row containing fibers from each channel;

a summation network for each row of fibers, each network including:

M selectively activatable detectors each receiving optical signals from a given fiber, each detector providing an electrical output signal at its output if activated by a given bias signal when illuminated by an incident optical signal from its associated fiber, addressing means coupled between a source of said given bias voltage and said detectors for selectively activating a given detector by applying the bias voltage source thereto, said addressing means including a multiplexer device having a plurality of complementary metal oxide semiconductor (CMOS) field effect transistors, each transistor having an output coupled to an input of a given detector, said transistors being coupled in common to said bias voltage source, with said multiplexer including selector inputs for selectively energizing a given transistor to thereby couple the bias voltage to the detector thereby activating same, all of the detector outputs being coupled to a node, and each network including a common amplifier means for amplifying the current delivered to the node from the selected detector;

whereby only one amplifier means is required for each row of fibers thereby minimizing the number of components required for the switch.

2. The switch of claim 1 wherein each detector comprises a metal-semiconductor-metal (MSM) device.

3. The switch of claim 1 wherein said amplifying means comprises a preamplifier for converting current delivered to the node to a voltage level, and a voltage amplifier for amplifying said voltage level to an amplitude suitable for transmission to said output receivers.

4. The switch of claim 3 where there are N×M detectors.

5. The switch of claim 4 wherein N and M are 8.

6. An optoelectric crossbar switch for selectively connecting signals from M optical fiber channels to N output receivers, said switch comprising:

splitter means for splitting each optical channel into N optical fibers;

said fibers being arranged in an array having a plurality of rows and columns, each row containing fibers from each channel;

a summation network for each row of fibers, each network including:

M selectively activatable detectors each receiving optical signals from a given fiber, each detector providing an electrical output signal at its output if activated by a given bias signal when illuminated by an incident optical signal from its associated fiber and each detector comprising a metal-semiconductor-metal (MSM) device, addressing means coupled between a source of said given bias voltage and said detectors for selectively activating a given detector by applying the bias voltage source thereto, said addressing means including a multiplexer device having a plurality of complementary metal oxide semiconductor (CMOS) field effect transistors, each transistor having an output coupled to an input of a given detector, said transistors being coupled in common to said bias voltage source, with said multiplexer including selector inputs for selectively energizing a given transistor to thereby couple the bias voltage to the detector thereby activating same, all of the detector outputs being coupled to a node, and each network including a common amplifier means for amplifying the current delivered to the node from the selected detector;

wherein only one amplifier means is required for each row of fibers thereby minimizing the number of components required for the switch.

7. The switch of claim 6 wherein said amplifying means comprises a preamplifier for converting current delivered to the node to a voltage level, and a voltage amplifier for amplifying said voltage level to an amplitude suitable for transmission to said output receivers.

8. The switch of claim 7 where there are N×M detectors.

9. The switch of claim 8 wherein N and M are 8.

* * * * *

UNITED STATES PATENT AND TRADEMARK OFFICE
CERTIFICATE OF CORRECTION

PATENT NO. : 4,953,155

DATED : August 28, 1990

INVENTOR(S) : GREGORY L. TANGONAN, et al.

It is certified that error appears in the above-identified patent and that said Letters Patent is hereby corrected as shown below:

Col. 4, line 28, delete "optoelectric" and insert --optoelectronic--.

Col. 5, line 6, delete "optoelectric" and insert --optoelectronic--.

Col. 6, line 15, delete "wherein" and insert --whereby--.

Col. 6, line 25, delete "wherein" and insert --where--.

Signed and Sealed this

Second Day of November, 1993

Attest:

BRUCE LEHMAN

Attesting Officer

*Commissioner of Patents and Trademarks*